(12) United States Patent
Li et al.

(10) Patent No.: US 11,516,618 B2
(45) Date of Patent: Nov. 29, 2022

(54) SOCIAL NETWORKING USING AUGMENTED REALITY

(71) Applicant: Lemon Inc., Grand Cayman (KY)

(72) Inventors: Yunjiu Li, Los Angeles, CA (US);
Siyao Yang, Los Angeles, CA (US);
Xin Ye, Los Angeles, CA (US);
Wenjing Fan, Los Angeles, CA (US);
Yiheng Zhu, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 112 days.

(21) Appl. No.: 17/066,818

(22) Filed: Oct. 9, 2020

(65) Prior Publication Data

US 2022/0116734 A1 Apr. 14, 2022

(51) Int. Cl.
*H04W 4/02* (2018.01)
*H04W 4/021* (2018.01)
*G06T 15/20* (2011.01)
*G06T 19/00* (2011.01)
*G06Q 50/00* (2012.01)
*G06T 19/20* (2011.01)

(52) U.S. Cl.
CPC ............ *H04W 4/021* (2013.01); *G06Q 50/01* (2013.01); *G06T 15/205* (2013.01); *G06T 19/006* (2013.01); *G06T 19/20* (2013.01); *H04W 4/023* (2013.01); *G06T 2215/16* (2013.01)

(58) Field of Classification Search
CPC ....... H04W 4/021; G06T 19/006; G06T 19/20
USPC ...................................... 455/456.3
See application file for complete search history.

(56) References Cited

U.S. PATENT DOCUMENTS

| 10,268,921 | B2 | 4/2019 | Gusarov |
| 10,592,765 | B2 | 3/2020 | Fathi et al. |
| 11,023,572 | B2 * | 6/2021 | Chun .................... H04W 4/021 |
| 2016/0210602 | A1 * | 7/2016 | Siddique .............. G06Q 20/384 |
| 2018/0089510 | A1 | 3/2018 | Li |
| 2019/0318076 | A1 | 10/2019 | Chun et al. |
| 2019/0362563 | A1 | 11/2019 | Mukherjee et al. |
| 2019/0371067 | A1 | 12/2019 | Simari et al. |
| 2021/0016174 | A1 * | 1/2021 | Yang ....................... A63F 13/69 |
| 2021/0074068 | A1 * | 3/2021 | Spivack ............ G06F 16/90332 |

FOREIGN PATENT DOCUMENTS

CN      111580661 A      8/2020

OTHER PUBLICATIONS

International Patent Application No. PCT/SG2021/050570; Int'l Search Report; dated Dec. 17, 2021; 4 pages.

\* cited by examiner

*Primary Examiner* — Thomas J Lett
(74) *Attorney, Agent, or Firm* — BakerHostetler

(57) ABSTRACT

Systems and methods for social networking using augmented reality are disclosed. A network may receive, from a plurality of client devices, a request to connect to a server. The server may be associated with an object, such as a landmark or a product. The server may serialize an AR world including the object and content associated with the object and send, to the plurality of client devices, data indicative of the AR world. The server via network may receive, from a first client device among the plurality of client devices, an indication of user input associated with the AR world. The indication of user input may comprise text data, digital image data, or user feedback. The indication of user input may be broadcast to the plurality of client devices.

22 Claims, 10 Drawing Sheets

SOCIAL NETWORKING USING AUGMENTED REALITY

BACKGROUND

Communication is increasingly being conducted using Internet-based tools. The Internet-based tools may be any software or platform. Existing social media platforms, such as YouTube and Facebook, enable users to communicate with each other by sharing images, videos, and other information via static app or web pages. As communication devices, such as mobile phones, become more sophisticated, people continue to desire new ways for social networking and communication.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Figure 1:
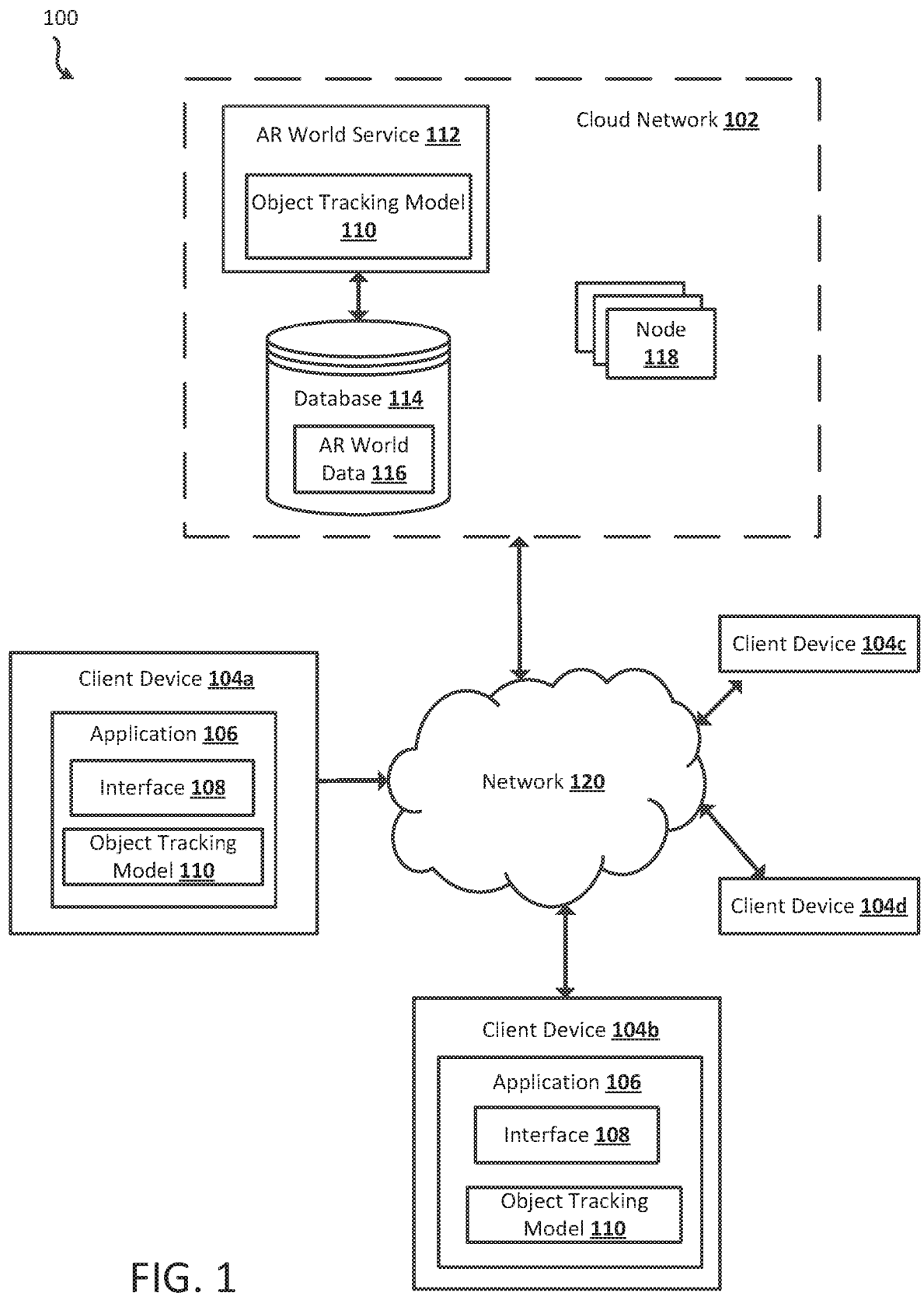
FIG. 1 shows an example system for social networking using augmented reality.

FIG. 1 illustrates an example system 100 for distributing content. The system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host an augmented reality (AR) service 112. The AR service 112 may augment graphics, video, sound and other inputs on real world objects. For instance, the AR service 112 may lay digital elements, such as images and user input, over an object in a real-world environment. The AR service 112 may be configured to receive and distribute AR data 116 via a variety of transmission techniques. The AR data 116 may comprise images, videos, audio data, text data, and/or other data. In an example, the AR data 116 comprise data indicative of an object in a real-world environment, such as a landmark or a product. The AR data 116 may further comprise content associated with the object, such as text, a graphic, or information indicative of user feedback. The AR data 116 may be used to generate an AR world comprising the object and content associated with the object. The AR data 116 may be stored in a database 114. For example, the AR service 112 may comprise a social networking service, a content sharing platform, a collaborative gaming platform, and/or the like.

In an embodiment, at least one of the AR service 112 or the client devices 104a-d comprise an object tracking model 110. The object tracking model 110 may be configured to automatically extract information from an image, such as a photograph or a poster, a scene, such as a real-world environment, or a video stream. In an embodiment, the object tracking model 110 may use positive and negative training applied by a machine learning algorithm or computer vision algorithms to extract information, such as labels or identifying properties, from an image, scene, or video stream. Once extracted, the information may be used to detect at least one object, feature, or element of interest that are present in the image, scene, or video stream. For example, the information may be used to detect products or landmarks that are present in an image or a scene. The object tracking model 110 may be configured to identify the objects, features, or elements of interest that have been detected in the image or in the scene.

In an embodiment, to identify the objects, features, or elements of interest that are present in the image, scene, or video stream, the object tracking model 110 compares a detected object, feature, or element of interest with information stored in a database, such as the database 114. The information stored in the database may comprise information about objects, features, or elements of interest that have already been imaged and characterized. In the event that the detected object, feature, or element of interest matches an object, feature, or element of interest stored in the database, the object tracking model 110 identifies the detected object, feature, or element of interest as the object, feature, or element of interest. For example, if the object tracking model detects a unique immobile object such as landmark in an image, scene, or video stream, the detected landmark may be compared with information stored in the database to determine that the detected landmark is, say, the Eiffel Tower.

In an embodiment, the information extracted by the object tracking model 110 includes one or more measurements associated with an object, feature, or element of interest. For example, the one or more measurements may include information about the dimensions of an object, the placement of the object relative to other objects in the scene, or geometric or topological information. Such techniques for recognizing objects are known. In one example, the object tracking model 110 may match pixels in a graphic file taken from a user's camera with a set of points associated with the stored model of the object, feature, or element of interest. The object tracking model 110 may be configured to determine a number of lines approximate corresponding lines associated with the object, feature, or element of interest. The set of points may be a connected series of line segments or links, such as a polyline, that the object tracking model 110 has generated and fitted to the set of pixels. The object tracking model 110 may also determine slope angles for each link in the polyline. In short it is known to identify lines in one or more graphic images with lines in a model associated with an object in order to identify the object. Other techniques may be used to identify objects in an image.

In an embodiment, the object tracking model 110 is configured to segment images, such as 2D images, into multiple regions to determine 3D information about the object, feature, or element of interest. Different features present in the image, scene, or video stream can be differentiated and separated from the image, scene, or video stream, allowing the object tracking model 110 to extract useful 3D information about the object, feature, or element of interest.

In an embodiment, the object tracking model 110 is configured to convert distance information associated with the extracted set of median pixels into coordinate values in a three-dimensional space, such as the real-world environment containing the object, feature, or element of interest. For example, the object tracking model 110 may be configured to convert the positional information of the pixels into coordinate values in real space. The coordinate values in real space can be 3D coordinates. By converting the distance information associated with the pixels into 3D coordinates, the distance information may be treated as spatial distance information.

The object tracking model 110 may be further configured to normalize at least a part of the 3D coordinate information. For example, in an embodiment, the object tracking model 110 is configured to output normalized coordinate space relative to the detected object. The object tracking model 110 is configured to normalize the distance by normalizing at least part of the 3D coordinate information. Distance normalization may be performed by reducing or increasing the distance between the detected object, feature, or element of interest and a client device 104a-d. For example, if two different client devices 104a-d are located at different distances away from the detected object, feature, or element of interest, the object tracking model 110 may normalize the two different distances so that the two different client devices 104a-d are located at the same distance from the detected object, feature, or element of interest. The same distance may be a predetermined distance.

In an embodiment, the object tracking model 110 is configured to normalize the distance relative to the object while maintaining a direction relative to the object. For example, if two different client devices 104a-d that are located at different distances from the detected object, feature, or element of interest have different lines of sight to the detected object, feature, or element of interest, the object tracking model 110 may normalize the two different distances so that the two different client devices 104a-d are located at the same distance from the detected object, feature, or element of interest while maintaining the different lines of sight associated with the different client devices 104a-d.

In an embodiment, the AR data 116 provided by the AR service 112 comprises user input. The user input may include content such as at least one of text data, digital image data, or user feedback data. If the user input comprises text data, the text data may include textual information that the at least one user of the AR service 112 wants to be overlaid onto the object to be viewed by other users of the AR service 112. The text data may comprise at least one of a letter, a word, or a phrase and may comprise various fonts, colors, or sizes and may be written in any language. If the user input comprises digital image data, the digital image data may include digital images that the at least one user of the AR service 112 wants to be overlaid onto the object to be viewed by users of the AR service 112. The digital image data may comprise at least one of a drawing or an emoji. The drawing may be various shapes or various colors. If the user input comprises user feedback data, the user feedback may indicate whether the at least one user of the AR service 112 likes or dislikes the object or whether the at least one user of the AR service 112 likes or dislikes user input from other users of the AR service 112. The user feedback may comprise "likes" or "un-likes."

The AR data 116 may be output to different client devices 104a-d via the cloud network 102. For example, the AR data 116 may be streamed to the client devices 104a-d. The plurality of client devices 104a-d may be configured to access the AR data 116 from the AR service 112. In an embodiment, client devices 104a-b may comprise an application 106 and an object tracking model 110. The applications 106a-b may output (e.g., display, render, present) an AR world generated based on the AR data 116 to a user associated with the client devices 104a-b.

The client devices 104a-d may comprise any type of computing device, such as a mobile device, a tablet device, laptop, a desktop computer, a smart television or other smart device (e.g., smart watch, smart speaker, smart glasses), a gaming device, a set top box, digital streaming device, robot, and/or the like. The client devices 104a-d may be associated with one or more users. A single user may use one or more of the client devices 104a-d to access the cloud network 102. The client devices 104a-d may travel to a variety of locations and use different networks to access the cloud network 102.

The AR service 112 may be configured to receive input from users. The users may be registered as users of the AR service 112 and may be users of the application 106 operating on client devices 104a-d. The user inputs may include connection requests and user input data, such as text data, digital image data, or user content. The connection requests may comprise requests from the client devices 104a-d to connect to the AR service 112. The user input data may include information that the users connected to the AR service 112 want to share with other connected users of the AR service 112.

In an embodiment, a user may use the application 106 on a client device 104a-d to send the client input data to the AR service 112. The client devices 104a-d may access an interface 108 of the application 106 that allows users input text data, digital image data, or user feedback. The interface 108 may comprise an input element. For example, the input element may be configured to receive the text data, digital image data, or user feedback from the user. The application 106 may determine timing information for the input, such as when a user input the text data. The application 106 may send the input and associated metadata to the cloud network 102. For example, the application 106 may send text data or digital image data, an identifier of the user that input the data, and the timing information for the text data or digital image data to the cloud network 102. The AR service 112 may store the input and associated metadata in a database 114.

The AR service 112 may be configured to output data to users. For example, the AR service 112 may serialize an AR world including the object and content associated with the object, and transmit data indicative of the AR world to users via the network 120. The users may be registered as users of the AR service 112 to share and view information about an object, such as a landmark or a product. The users may be users of the application 106 operating on client devices 104a-d. The application 106 may output (display, render, present) the AR world to a user associated with a client device 104a-d. The client devices 104a-d may access an interface 108 of the application 106. The interface 108 may comprise an output element. The output element may be configured to display the AR world so that a user can input information associated with the AR world.

In an embodiment, the user input associated with an AR world may be output to all users viewing the same AR world. For example, all users connected to a server associated with a particular object may view user input received by the AR service 112 from any users connected to the server. User input may be output by the AR service 112 in real-time or near-real-time. The application 106 may display the user input overlaid on the AR world in various ways on the client device 104a-d. For example, the user input may be shown scrolling across the AR world. By way of example and without limitation, the user input may be shown scrolling across the AR world from right to left and may reappear on the right side of an interface 108 of the user device 104a-d after it has scrolled all of the way to the left.

The plurality of computing nodes 118 may process tasks associated with the AR service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

Figure 2:
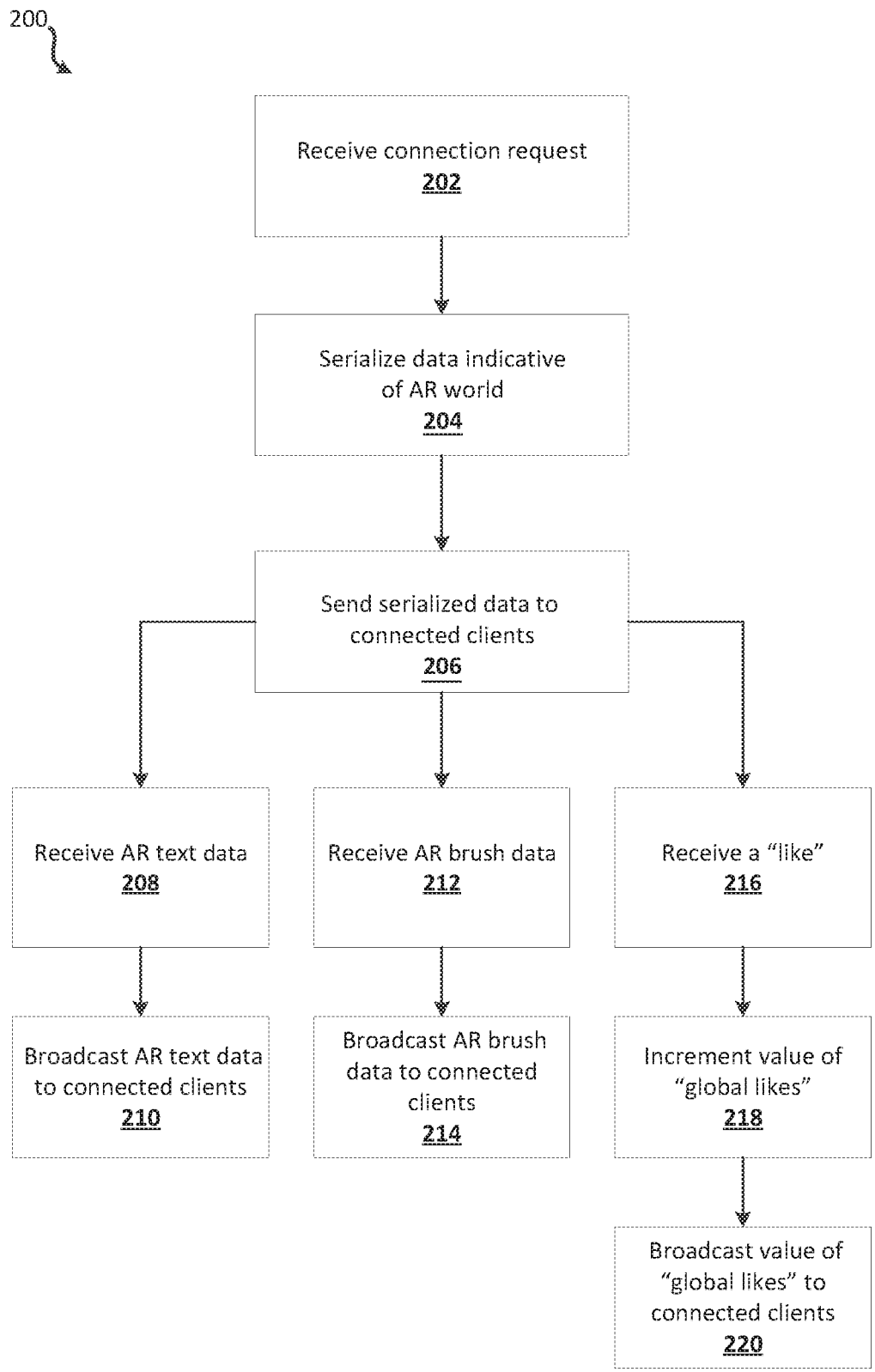
FIG. 2 shows an example process for social networking using augmented reality, which may be performed by a cloud network in accordance with the present disclosure.

FIG. 2 illustrates an example process 200 performed by the cloud network (e.g. cloud network 102). The cloud network 102 may perform the process 200 to augment a real-life environment with information shared by users. Although depicted as a sequence of operations in FIG. 2, those of ordinary skill in the art will appreciate that various embodiments may add, remove, reorder, or modify the depicted operations.

At 202, the cloud network 102 may receive at least one connection request. The at least one connection request may be received from at least one client device, such as client devices 104a-d. The at least one connection request may comprise a request from at least one client device to connect to a server, such as the AR service 112. The request from the at least one client device may comprise information indicating that the at least one client device is proximate to a real-world environment including an object or proximate to an image including the object. The object may be a unique immobile object, such as a landmark or a product. The request from the at least one client device to connect to a server may indicate the object that a camera of the at least one client device is directed toward, e.g., focused on. If the camera of the client device is directed toward a particular landmark, the connection request from the at least one client device may be a request to join a server associated with the landmark. For example, if the camera of a client device is directed toward a well-known building, the request from the client device may be a request to connect to a server associated with the well-known building.

In an embodiment, the cloud network 102 may receive more than one request to connect to the same server. This may happen, for example, if the cameras of two client devices, such as client devices 104a-b, are directed toward the same object or product. If two client devices are both directed toward the same building, the cloud network 102 may receive two requests to connect to the server associated with that building. The requests to connect to the same server may be received by the cloud network 102 simultaneously or at different times. For example, the camera of client device 104a may be directed toward the building at a first time and the camera of the client device 104b may be directed toward the building at a second, later time. In that case, the cloud network 102 may receive a connection request from the client device 104a before it receives a connection request from the client device 104b. In another example, the cameras of client devices 104a-b may be directed toward the same well-known building at the same time. In that case, the cloud network 102 may receive connection requests from both devices simultaneously.

To determine an object that the camera of the at least one client device is directed toward, an object tracking model, such as the object tracking model 110, may be used. The object tracking model 110 may be located in at least one of the server or the at least one client device. The object tracking model 110 may be configured to detect an object, such as a landmark or a product, that the camera of the at least one device is directed toward. The object tracking model 110 may output a common coordinate space and 3D coordinate frame such that a position of the client device relative to the object can be determined. For example, as illustrated in FIGS. 4a-b, an object 402, such as a building, may be detected by the object tracking model.

Figure 4A:
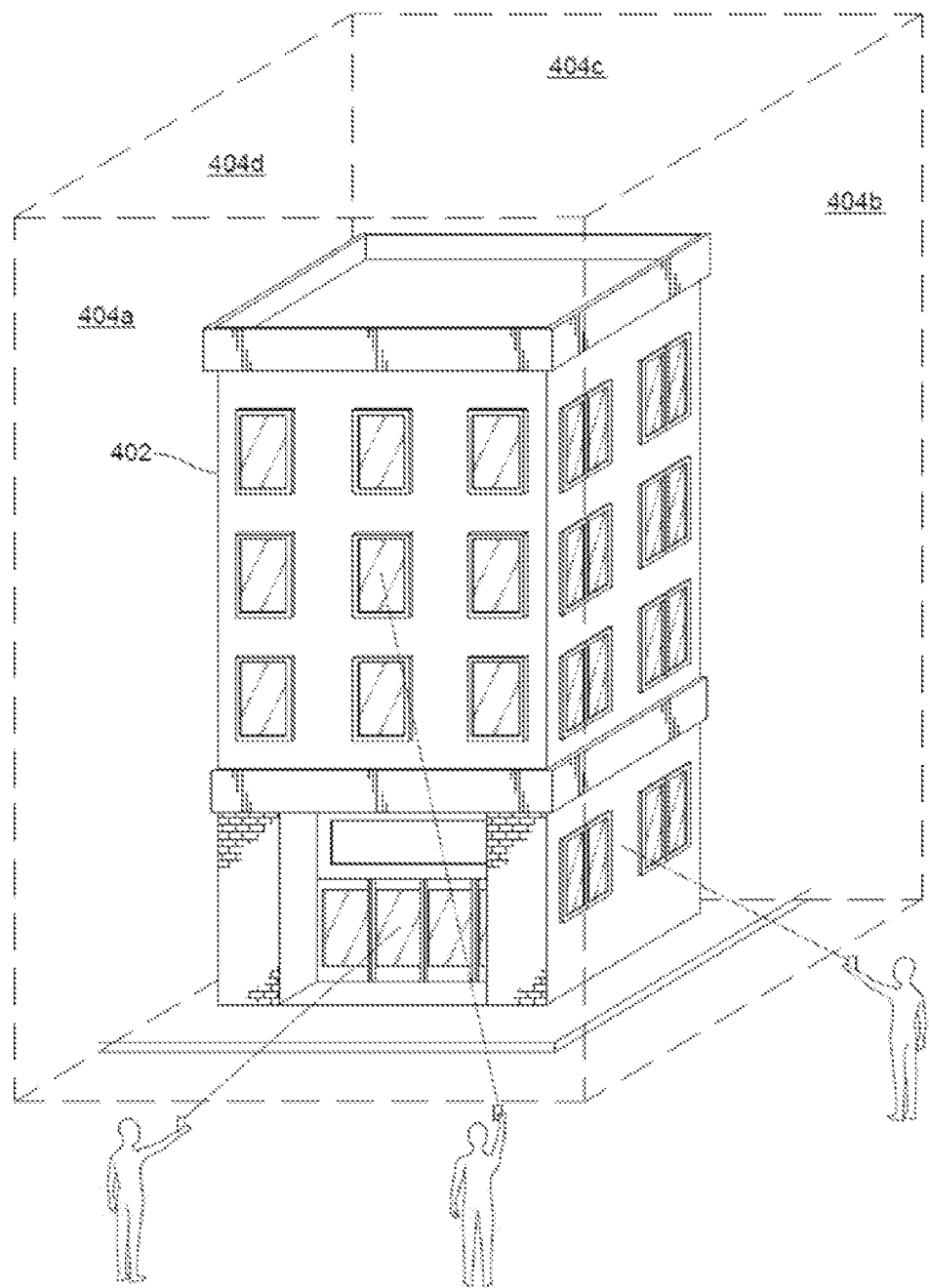
FIGS. 4a-b show an example object being tracked by an object tracking model in accordance with the present disclosure.

In an embodiment, as shown in FIG. 4a, when the object tracking model detects the object 402, the camera of the client device may be positioned relative to one of four planes that are positioned around the object: 404a. 404b, 404c, or 404d. The camera of the client device may have a variety of different lines of sight to the object 402 and may detect the object 402 from these different lines of sight. For example, FIG. 4a illustrates a scenario where the camera of two client devices are positioned so that they are on a side opposite the plane 404a relative to the object. The cameras of the two client devices positioned so that they are on a side opposite the plane 404a relative to the object have two different lines of sight to the object 402. FIG. 4a also illustrates a scenario where the camera of a client device is positioned so that it is on a side opposite the plane 404b.

The planes represent a mathematical construct that is calculated relative to the object. User messages and graphics are projected onto a plane, such as the plane 404a, 404b, 404c, or 404d. A client device views the messages that are projected onto the plane based on a calculation that determines where the client device is located relative to the object and the plane. When the camera is positioned on a side opposite the plane 404a relative to the object, the camera may be directed toward a first portion of the object and the client device may view the messages projected onto the particular plane. When the camera is positioned on a side opposite one of the other planes 404b-d, the camera may be directed towards different portions of the object, such as different sides of the building.

Figure 4B:
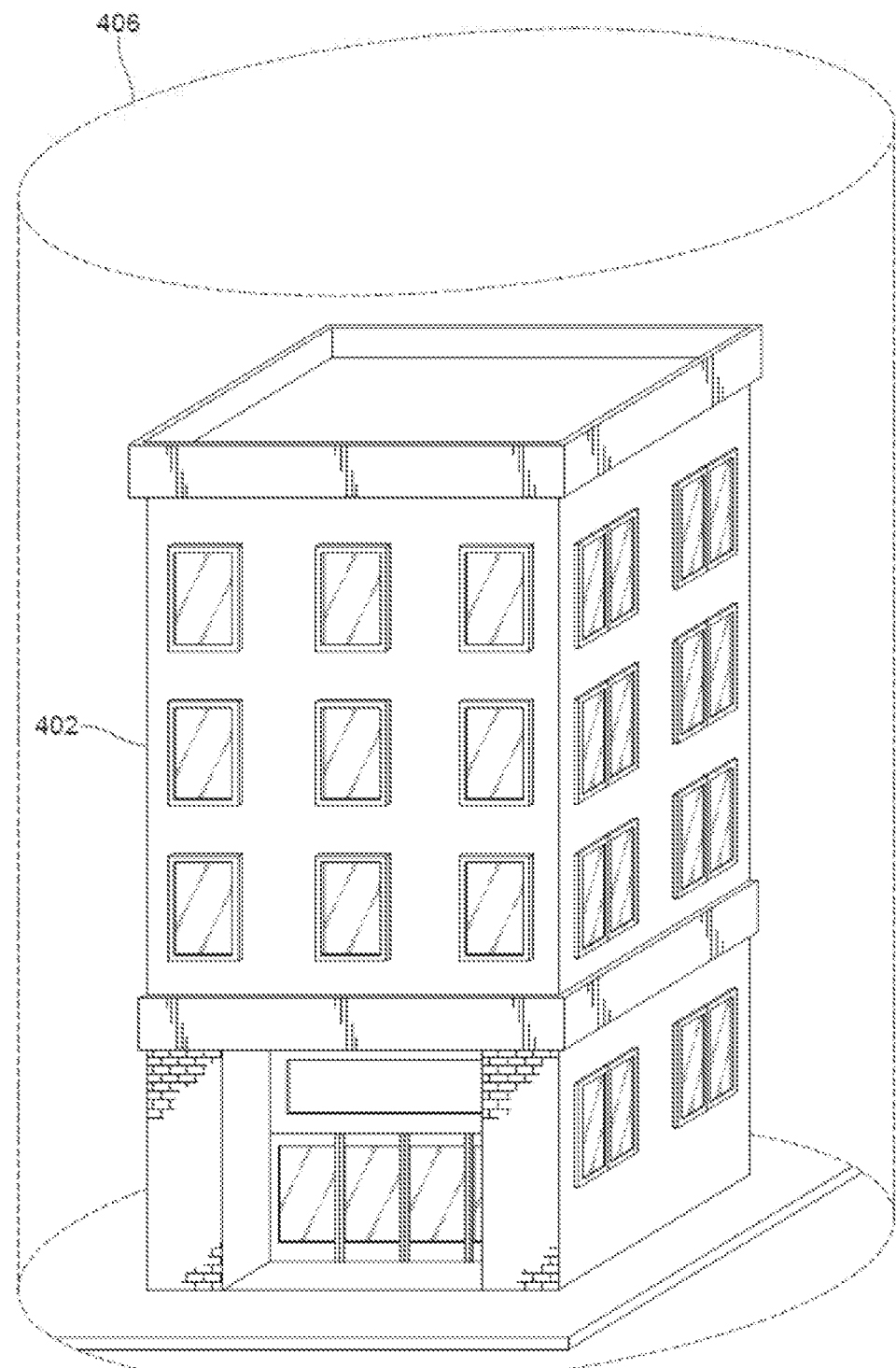

In another embodiment, as shown in FIG. 4b, when the object tracking model detects the object 402, the camera of the client device may be positioned relative to a construct in the form of a cylinder 406 that is positioned around the object 402, i.e. a building. The cylinder 406 may be a right cylinder or an oblique cylinder. The bases of the cylinder 406 may or may not be circles. User messages and graphics are projected onto this cylinder 406 and a client device views the messages that are projected onto this cylinder 406 based on a calculation that determines where the client device is located relative to the object 402 and the cylinder 406. When the camera is positioned on a side opposite the cylinder 406 relative to the object 402, the camera may be directed toward a first portion of the object 402 and the client device may view the messages projected onto that particular portion of the cylinder 406. Other structures are also contemplated, such as a structure having sides arranged in a hexagonal fashion or any other arbitrary geometric meshes.

Referring back to FIG. 2, at 204, the cloud network 102 may serialize the current AR world. The current AR world may comprise an object that the camera of the at least one client device is directed toward. For example, the current AR world may comprise the object, such as the building, recognized by the object tracking model. The current AR world may further comprise content associated with the object and received from user devices. The content associated with the object may comprise text, a graphic, or information indicative of user feedback associated with the object. The cloud network 102 may serialize the current AR world to an array of bytes. In an embodiment, the array of bytes may be saved in a database, such as database 114. If the array of bytes is saved in a database, the array of bytes may be loaded at a later time to continue the AR world session. In another embodiment, the array of bytes may be sent over a network, such as network 120, to at least one client device. If the array of bytes is sent over a network to at least one client device, the AR world session may be shared by the users associated with the at least one client device.

For example, the cloud network 102 may send, to at least one connected client, serialized data indicative of an AR world at 206. The cloud network 102 may send the serialized data indicative of AR world to the at least one connected client by sending the serialized data to at least one connected client device, such as client devices 104a-d. For example, the AR world service 112 may send, to at least one connected client device, data indicative of the object, content associated with the object, and information indicative of a location of the content relative to the object for display of the content. The at least one connected client device may include the at least one client device that the cloud network 102 received a connection request from at 202. If the at least one connected client device comprises an application, such as the application 106, the cloud network 102 may send serialized data indicative of the AR world to the application. The application may generate and output the AR world on an interface of the at least one connected client device, such as interface 108. An exemplary user interface is described below with reference to FIG. 6.

At 208, the cloud network 102 may receive, from at least one connected client, a first indication of user input. The first indication of user input may be received from at least one connected client device, such as client devices 104a-d. For example, the cloud network 102 may receive the first indication of user input from at least one connected client via the at least one connected client device. If the at least one connected client device comprises an application, such as the application 106, the at least one connected client may input the first indication of user input using the application. The cloud network 102 may store the received first indication of data in a database, such as database 114.

The first indication of user input may comprise data, such as text data. The text data may comprise at least one of a letter, a word, or a phrase. The text data may include textual information that the at least one connected client wants to be overlaid onto the AR world. The text data may comprise various fonts, colors, or sizes and may be written in any language.

The first indication of user input may include a coordinate frame. The coordinate frame may indicate where the at least one connected client wants the first indication of user input to be overlaid onto the AR world. For example, if the AR world displays a building, the at least one connected client may want text data to be displayed near the base of the building. The coordinate frame may indicate a location near the base of the building. In another example, the at least one connected client may want text data to be displayed near the top of the building. The coordinate frame may indicate a location near the top of the building.

At 210, the cloud network 102 may broadcast the first indication of user input to at least one connected client. The first indication of user input may be broadcast to any client devices, such as client devices 104a-d, that are connected to the same server. Each client connected to the same server may be able to view the first indication of user input after it is broadcast by the cloud network 102. For example, the client devices 104a and 104b may both be connected to the same server, such as the server associated with the building. If text data is received from the connected client using the client device 104a, the broadcasted text data may be viewed by the connected client using the client device 104b. If the first indication of user input includes a coordinate frame, the cloud network 102 may broadcast the first indication of user input in the location indicated by the coordinate frame.

At 212, the cloud network 102 may receive, from at least one connected client, a second indication of user input. The second indication of user input may be received from at least one connected client device, such as client devices 104a-d. For example, the cloud network 102 may receive the second indication of user input from the at least one connected client device. If the at least one connected client device comprises an application, such as the application 106, the at least one connected client may input the second indication of user input using the application. The cloud network 102 may store the received second indication of data in a database, such as database 114. The first and second indications of user input may be received from the same connected client or from different connected clients.

The second indication of user input may comprise data, such as digital image data. The digital image data may comprise at least one of a drawing or an emoji. The digital image data may include digital images that the at least one connected client wants to be overlaid onto the AR world. If the digital image data includes a drawing, the drawing may be created by the at least one connected client using an application, such as the application 106. The at least one connected client may use the application to "paint" the drawing onto the object. The drawing may be various shapes or various colors. In one embodiment, the digital image data may include at least one of images or videos that are stored in the client devices or captured in real-time by the client devices.

The second indication of user input may include a coordinate frame. The coordinate frame may indicate where the at least one connected client wants the second indication of user input to be overlaid onto the AR world. For example, if the AR world displays the building, the at least one connected client may want digital image data to be displayed near the base of the building. The coordinate frame may indicate a location near the base of the building. In another example, the at least one connected client may want digital image data to be displayed near the top of the building. The coordinate frame may indicate a location near the top of the building. If the digital image data is a drawing, the at least one client may specify the desired coordinate frame by "painting" the drawing onto the object in the desired location.

At step 214, the cloud network 102 may broadcast the second indication of data to at least one connected client. The second indication of user input may be broadcast to any client devices, such as client devices 104a-d, that are connected to the same server. Each client connected to the same server may be able to view the second indication of user input after it is broadcast by the cloud network 102. For example, the client devices 104a and 104b may both be connected to the same server, such as the server associated with the building. If digital image data is received from the connected client using the client device 104a, the broadcasted digital image data may be viewed by the connected client using the client device 104b. If the second indication of user input includes a coordinate frame, the cloud network 102 may broadcast the second indication of user input in the location indicated by the coordinate frame.

At 216, the cloud network 102 may receive, from at least one connected client, a third indication of user input. The third indication of user input may be received from at least one connected client device, such as client devices 104a-d. For example, the cloud network 102 may receive the third indication of user input from at least one connected client via the at least one connected client device. If the at least one connected client device comprises an application, such as the application 106, the at least one connected client may input the third indication of user input using the application. The cloud network 102 may store the received third indication of data in a database, such as database 114. The first, second, and third indications of user input may be received from the same connected client or from different connected clients.

The third indication of user input may comprise user feedback, such as "likes" or "un-likes." In some embodiments, the user feedback may indicate whether the at least one connected client likes or dislikes the AR world. In another embodiments, the user feedback may include the at least one connected client's comments on the AR world. For example, if the AR world includes the building, landmark, product, or any other object, the user feedback may indicate whether the at least one connected client likes or dislikes the building, landmark, product, or any other object. In other embodiments, the user feedback may also indicate whether the at least one connected client likes or dislikes the first or second indications of user input that have been broadcasted by the cloud network 102.

If the third indication of user input comprises a "like," the cloud network 102 may, at 218, increase a quantity of global "likes." The quantity of global "likes" may indicate how many connected clients have "liked" the AR world. If the third indication of user input comprises a "dislike," the cloud network 102 may, at 218, decrease a quantity of global "likes." At 220, the cloud network 102 may broadcast the third indication of data to at least one connected client. The third indication of user input may be broadcast to the at least one connected client via at least one connected client device, such as client devices 104a-d. Each client connected to the same server may be able to view the third indication of user input after the third indication is broadcast by the cloud network 102. For example, the client devices 104a and 104b may both be connected to the same server, such as the server associated with the building. If a "like" is received from the connected client using the client device 104a, the "like" may be viewed by the connected client using the client device 104b. The connected client using the client device 104b may view the "like" by viewing the quantity of "global likes" increase.

Figure 3:
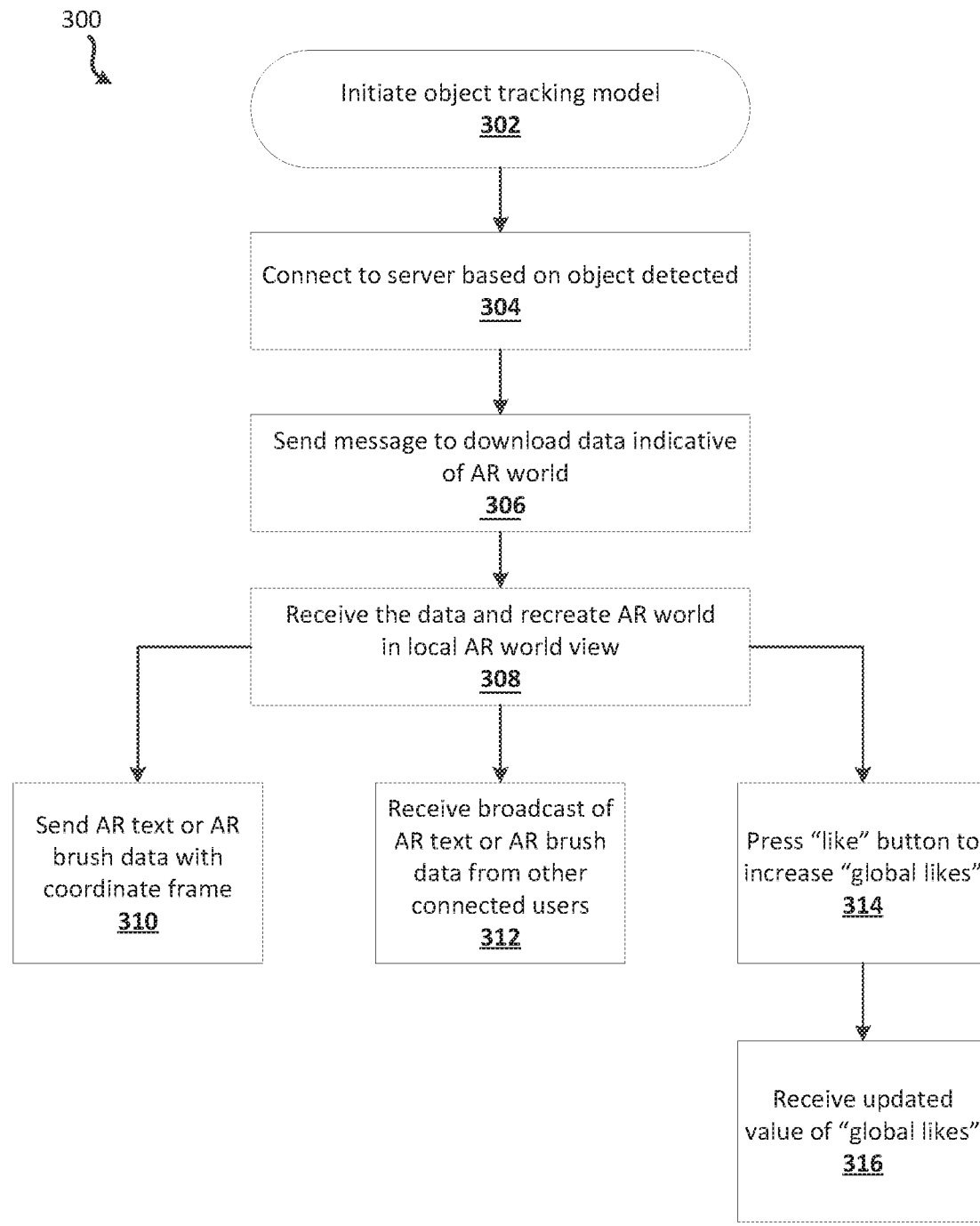
FIG. 3 shows an example process for social networking using augmented reality, which may be performed by a client device in accordance with the present disclosure.

FIG. 3 illustrates an example process 300 performed by a client device (e.g. client device 104a-d). The client device 104a-d may perform the process 300 to view and share information associated with a real-life environment. Although depicted as a sequence of operations in FIG. 3, those of ordinary skill in the art will appreciate that various embodiments may add, remove, reorder, or modify the depicted operations.

At 302, at least one client device, such as the client device 104a-d, may initiate an object tracking model, such as the object tracking model 110. In an embodiment, the at least one client device may automatically initiate the object tracking model by pointing a camera of the at least one client device at an object, such as a landmark or a product. In another embodiment, the user of the at least one client device may initiate the object tracking model manually. As discussed above, the object tracking model may determine which object the camera of the at least one client device is directed toward. In an example, the object tracking model may determine that the at least one client device is proximate to a first object or a second object being different from the first object. The object tracking model may be located at a server remote to the at least one client device or on the at least one client device. If the at least one connected client device comprises an application, such as the application 106, the object tracking model may be a part of the application. In another embodiment, the object tracking model may not be a part of the application. As discussed above and illustrated in FIG. 4a, the object tracking model may be configured to detect the object. In one embodiment, the object tracking model may also be configured to detect a position of the camera relative to the object. For example, as shown in FIG. 4a, when the object tracking model detects the object 402, the object tracking model may determine that the camera of the client device is positioned in a location relative to the object on one side of four plane constructs: 404a, 404b, 404c, or 404d. The plane constructs are one embodiment; however other constructs, such as those shown in FIG. 4b, are within the scope of the disclosure.

At 304, the at least one client device, such as the client device 104a-d, may connect to a server, such as the AR service 112, based on the object detected by the object tracking model. The at least one client device may connect to the server by sending a connection request to a network comprising the server, such as the cloud network 102. The connection request from the at least one client device may indicate the object detected by the object tracking model. If the object tracking model has determined that a camera of the at least one client device is directed toward a particular landmark or product, the connection request from the at least one client device may include a request to join a server associated with the landmark or product. For example, if the object tracking model has determined that a camera of the at least one client device is directed toward the building, the connection request from the at least one client device may include a request to connect to a server associated with the building.

In an embodiment, more than one client device may connect to the same server. This may happen, for example, if the cameras of two client devices, such as client devices 104a-b, are directed toward the same object. If the cameras of two client devices are both pointed at the same building, both devices may connect to the server associated with the building. The more than one client device may connect to the same server simultaneously or at different times. For example, the camera of client device 104a may be directed toward the building at a first time and the camera of the client device 104b may be directed toward the building at a second, later time. In that case, the client device 104a may connect to the server before the client device 104b connects to the server. In another example, the cameras of client devices 104a-b may be directed toward the building at the same time. In that case, the client devices 104a-b may connect to the server simultaneously.

At 306, the at least one client device, such as the client device 104a-d, may send a message to the server, such as the AR service 112. The message may be a "hello" message. The "hello" message may initiate a handshake between the at least one client device and the server. During the handshake, the at least one client device and the server may exchange information that establishes the protocols of a communication link. For example, during the handshake, the at least one client device and the server may signal to one another that they are both switched on and may agree on which protocols are being used. After the protocols of the communication link have been established, the at least one client device and the server may communicate with each other. The at least one client device may download, from a database such as the database 114, the AR world data 116 associated with the object detected by the object tracking model.

At 308, the at least one client device, such as the client device 104a-d, may receive the AR world data 116 from the server. The at least one client device comprising an application, such as the application 106, may use the AR world data 116 to recreate the AR world including the object in a local AR world view. A user of the at least one client device may view the object in the local AR world view on an interface, such as interface 108, of the at least one client device. Various aspect of the disclosed user interface are described herein with regard to certain examples and embodiments, which are intended to illustrate but not limit the disclosure.

Figure 5A:
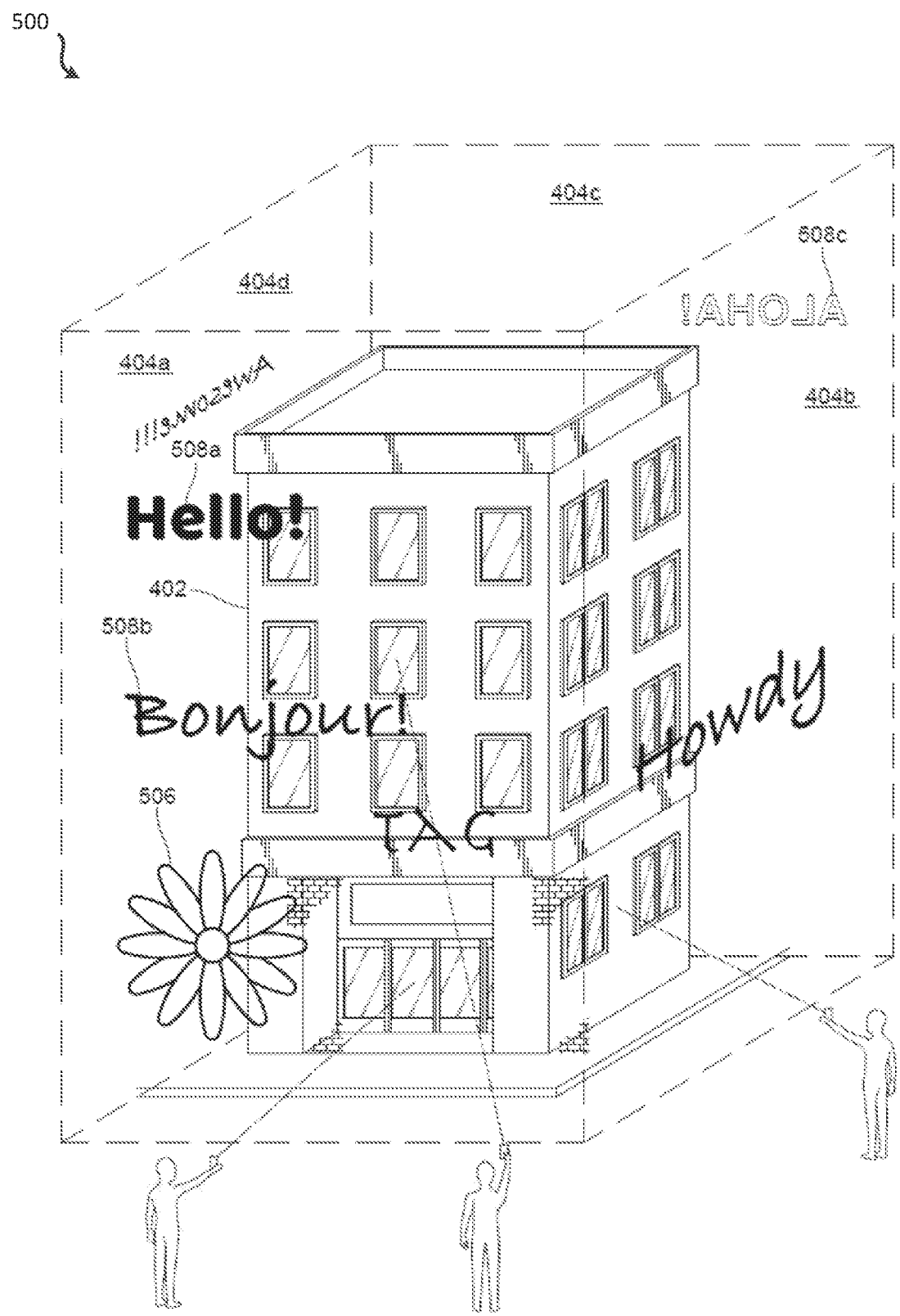
FIG. 5a-b shows an example of a real-life environment augmented by various social networking tools.
Figure 5B:
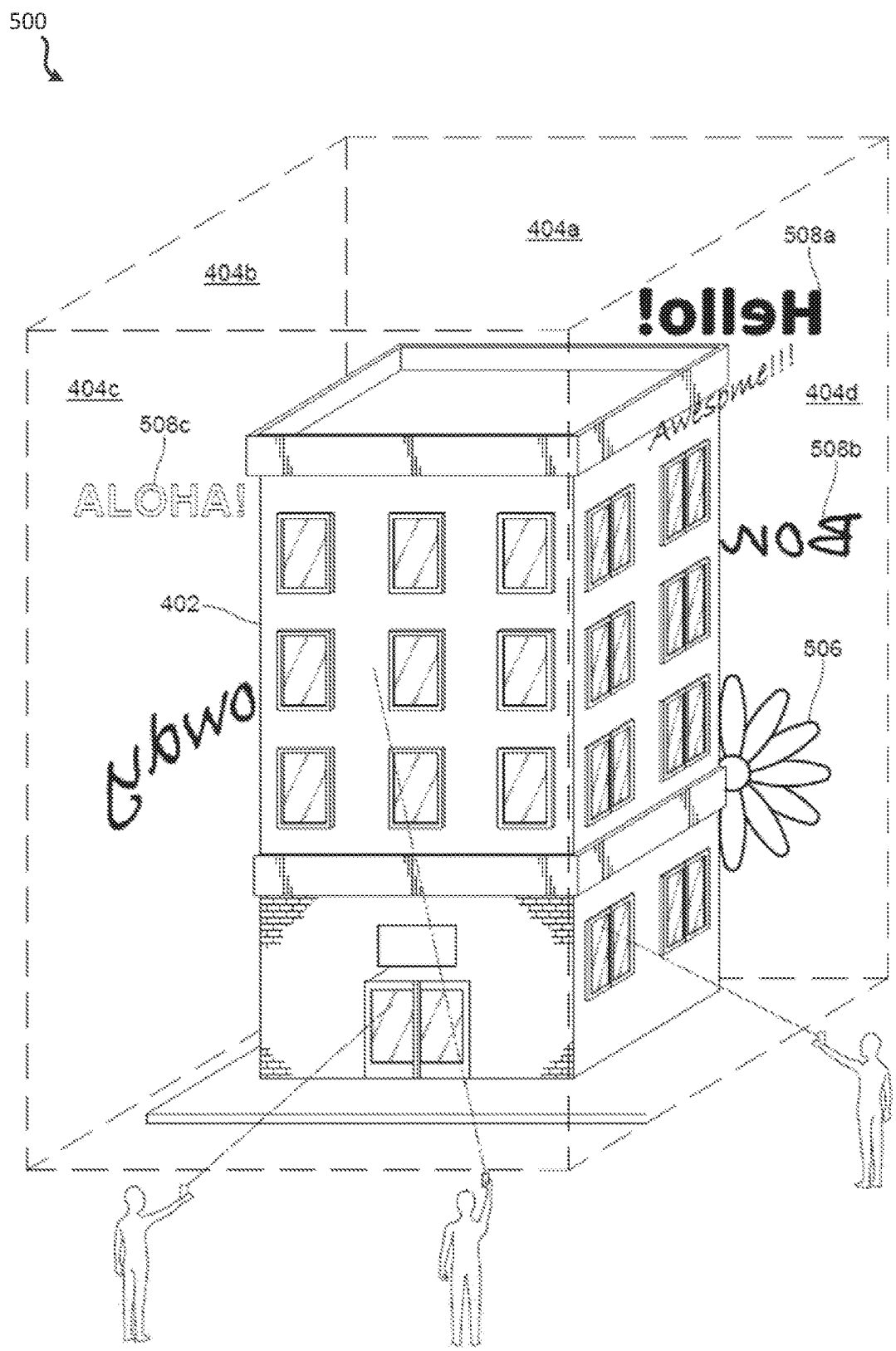

For example, as illustrated in FIGS. 5a-b, the at least one client device, such as the client device 104a-d, may recreate the AR world including the object, such as object 402 of FIG. 4a, in a local AR world view 500. FIG. 5a illustrates an exemplary local AR world view 500 recreated by a client device when a camera of the client device is positioned relative to the object on a side opposite a plane 404a. The local AR world view 500 may include user input that has previously been sent to the server from other client devices. For example, the local AR world view 500 may include text data or digital image data that has previously been sent to the server from other client devices.

In an embodiment, the user messages and graphics may be projected onto at least one of the planes 404a-d and the at least one client device may view the messages that are projected onto the at least one plane 404a-d based on a calculation that determines where the client device is located relative to the object i.e. the building and the plane. For example, when the camera of a client device is positioned on a side opposite the plane 404a relative to the object, the camera may be directed toward a first portion of the building and the client device may view the messages projected onto the plane 404a, such as the words 508a-b, the drawing 506, or the building tag. If the cameras of two client devices are both positioned on the side opposite the plane 404a relative to the building, but have different lines of sight to the building, they may view different messages projected onto the plane 404a. For example, if the camera of a first client device is positioned on the side opposite the plane 404a but is angled towards the bottom of the building, the first client device may only be able to view the messages positioned toward the bottom of the building. Likewise, if the camera of a second client device is positioned on the side opposite the plane 404a but is angled towards the center or top of the building, the second client device may only be able to view the messages positioned toward the center or top of the building.

As another example, when the camera of the client device is positioned on a side opposite the plane 404b, the camera may be directed toward a second portion of the building and the client device may view the messages projected onto the plane 404b, such as the word "Howdy." When the camera of the client device is positioned on a side opposite the plane 404c, the camera may be directed toward a third portion of the building and the client device may view the messages projected onto the plane 404c, such as the word 508c. When the camera of the client device is positioned on a side opposite the plane 404d, the camera may be directed toward a fourth portion of the object and the client device may view the messages projected onto the plane 404d, such as the word "Awesome."

In an embodiment, when the camera of the client device is positioned on a side opposite a particular plane, the client device may only view the user messages and graphics projected onto that particular plane. In another embodiment, when the camera of the client device is positioned on a side opposite a particular plane, the client device may be able to view user messages and graphics projected onto both that particular plane and also neighboring planes. For example, when the camera of the client device is positioned on a side opposite the plane 404a, the client device may be able to view both user messages and graphics projected onto the plane 404a and those projected onto at least one of the planes 404b-d. For example, the user messages projected onto plane 404a may appear in a normal manner and the user messages able to view projected onto the plane 404c may appear in a mirrored manner, such as the user message 508c.

The broadcasted content, such as the words 508a-c or the drawing 506, may be positioned in a static location in the local AR world view 500 or may be moving across the local AR world view 500. By way of example and without limitation, the broadcasted content may be moving from right to left on the local AR world view 500. In an example, when the broadcasted content is moving and reaches the far-left side of a particular plane, the broadcasted content may reappear on the far-right side of that plane and begin moving from right to left again. In another example, the broadcasted content may be moving from right to left on the local AR world view 500. In one embodiment, the broadcasted content may be moving across the local AR world view 500 along a predetermined track. In another example, the broadcasted content may be in a static location in the local AR world view 500.

The broadcasted content may be positioned in the local AR world view 500 in accordance with a coordinate frame. The coordinate frame may be provided by the user that input the content or in accordance with a coordinate frame selected by the server. In an embodiment, the user may pay to select the coordinate frame. If the broadcasted content is in a static location in the local AR world view 500, the coordinate frame may indicate the static location. If the broadcasted content is moving on the local AR world view 500, the coordinate frame may indicate a frame in which the broadcasted content may move. For example, the coordinate frame may indicate that the broadcasted content may be moving near the center of the local AR world view 500.

Figure 6:
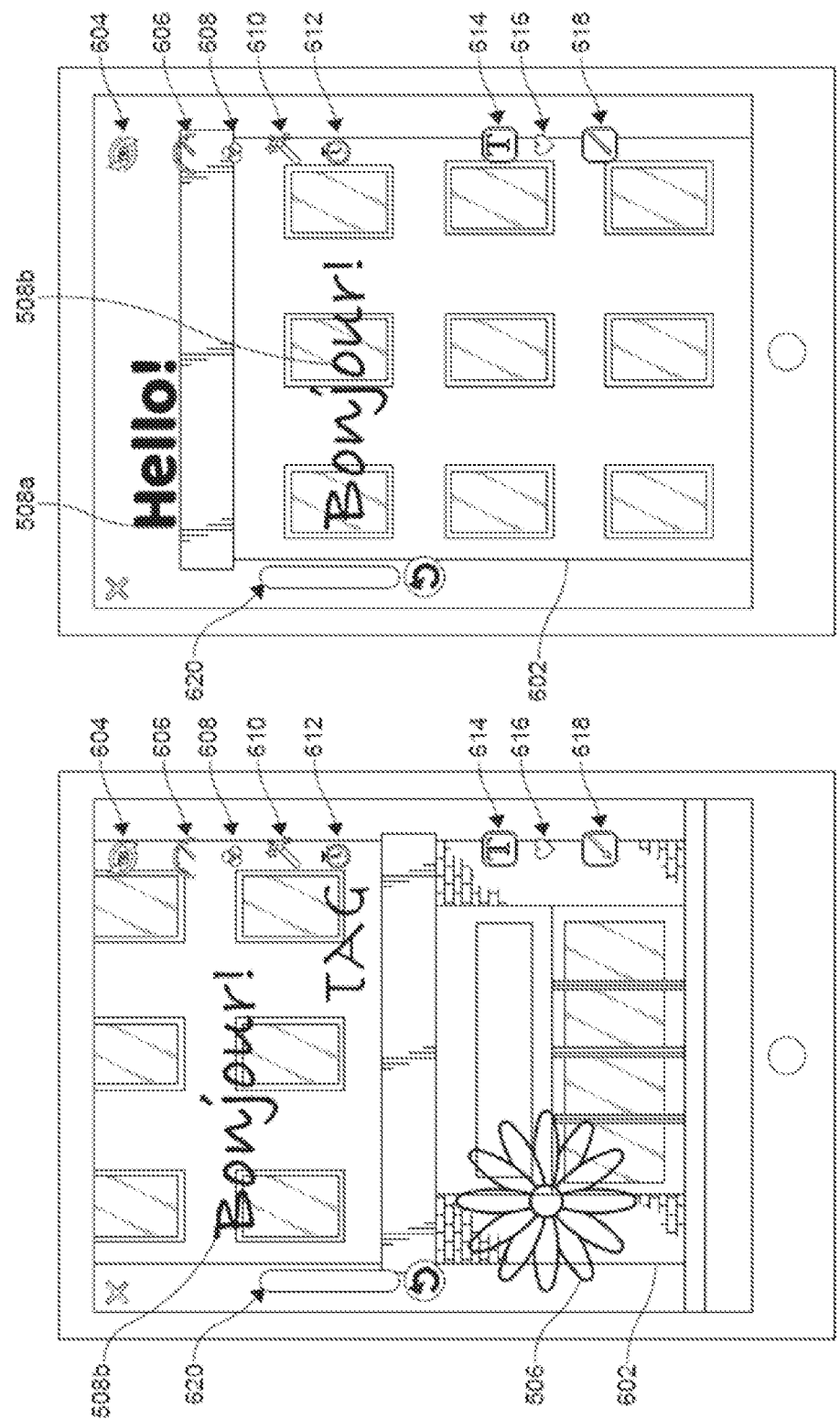
FIG. 6 shows an example user interface of an application for social networking using augmented reality in accordance with the present disclosure.
Figure 7:
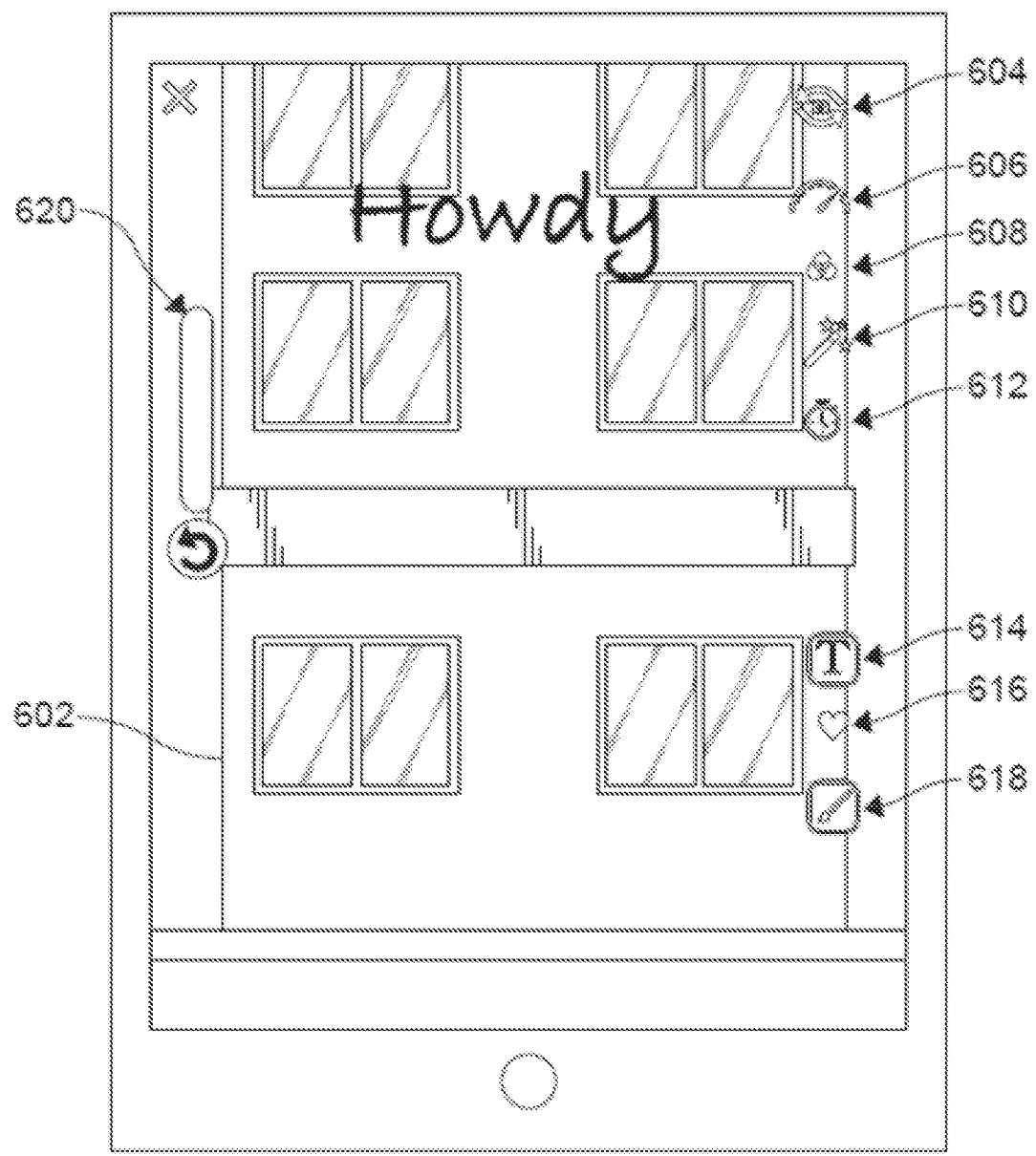
FIG. 7 shows another example user interface of an application for social networking using augmented reality in accordance with the present disclosure.

For example, as illustrated in FIGS. 6-7, the user may view an object, such as building 602, in the local AR world view on an interface of a client device. The local AR world view may include different portions of the object based on where the camera of the client device is positioned relative to the object. The user may view different portions of the object depending on which plane construct the user is on the opposite side of. For example, if the camera of the client device is positioned toward the bottom of a plane construct, the user may view the bottom of the portion of the object in that plane construct as well as the user messages overlaid on the bottom of the portion of the object in that plane construct. As another example, if the camera of the client device is positioned toward the top of a plane construct, the user may view the top of the portion of the object in that plane construct as well as the user messages overlaid on the top of the portion of the object in that plane construct.

The interface may comprise various options for the user to select. In an embodiment, the options may comprise at least one of a flip option 604, a speed option 606, a filter option 608, a beautify option 610, a timer option 612, a text option 614, a "like" option 616, or a paint option 618. When selected, the various options may allow the user to send different types of user input associated with the local AR world view to the server. For example, the various options may allow the user to send different types of user input to be overlaid on the potion of the object in a particular plane construct. The user may send the user input associated with the local AR world view to the server, for example, at 310. At 310, the at least one client device, such as the client device 104*a-d*, may send an indication of user input to the server. If the at least one client device comprises an application, such as the application 106, a user of the at least one client device may input the indication of user input using the application. The cloud network 102 may store the received indication of data in a database, such as database 114.

In an embodiment, the indication of user input comprises text data. The user may send text data associated with the local AR world view to the server using an interface, such as interface 108, configured to receive text input. For example, the user may input a letter, word, or phrase into a text bar using the characters provided in a digital keyboard. The letter, word, or phrase may be associated with the object. If the text data is configured to move across the interface, the user may choose a speed for the text data by selecting the speed button 606. As another example, the speed of the text data may be selected by the server. In another example, the text data may be statically positioned in the local AR world, with the static position selected by either the user or the server. If the text data is moving, the speed of the text data may indicate how quickly the text data will scroll across interfaces of connected user devices after it is broadcast by the server.

The text data may be displayed on the local AR world view for a predetermined amount of time. In an example, the user may choose a time for the text data by selecting the timer button 612. The time for the text data may indicate a duration that the text data will scroll across interfaces of connected user devices after it is broadcast by the server or may indicate a duration that the text data will remain in its static location on the local AR world view. In another example, the server may choose a time for the text data. In an embodiment, the user may pay to extend the duration of the text data. The duration may be any amount of time, such as 15 seconds, 30 seconds, or a minute. The user may choose a color for the text data by using the color scale 620. The user may choose a color for the text data by selecting a color on the color scale 620. A variety of colors may be included on the color scale. In another example, the server may choose the color for the text data. A user may be required to pay in order to choose the color of the text data.

In an embodiment, the text data may be associated with a coordinate frame. The coordinate frame may be selected by the user and may indicate where the user wants the text data to be overlaid onto the local AR world view. The user may be required to pay to select the coordinate frame. For example, if the local AR world view displays a building, the user may want text data to be displayed near the base of the building. The coordinate frame may indicate a location near the base of the building. In another example, the user may want text data to be displayed near the top of the building. The coordinate frame may indicate a location near the top of the building. The user may be given an option to pay in order to select a desirable coordinate frame. In another example, the coordinate frame may be selected by the server. If the server selects the coordinate frame, the server may select whether the text data is displayed near the top or bottom of the building.

In another embodiment, the indication of user input comprises digital image data, such as drawings, images, or emojis. The user may send digital image data associated with the local AR world view to the server by selecting the paint option 618. When the user selects the paint option 618, the user may be presented with an interface, such as interface 108, configured to receive digital image input. For example the user may input a drawing. To input the drawing, the user may use a finger to draw a shape on the interface. The digital image data be associated with the object. If the digital image data is configured to move across the interface, the user may choose a speed for the digital image data by selecting the speed button 606. As another example, the speed of the digital image data may be selected by the server. In another example, the digital image data may be statically positioned in the local AR world, with the static position selected by either the user or the server. If the digital image data is moving, the speed of the digital image data may indicate how quickly the digital image data will scroll across interfaces of connected user devices after it is broadcast by the server. In another embodiment, the digital image data may also include at least one of images or videos that are either stored in the client devices or captured in real-time by the client devices.

The digital image data may be displayed on the local AR world view for a predetermined amount of time. In an example, the user may choose a time for the digital image data by selecting the timer button 612. The time for the digital image data may indicate a duration that the digital image data will scroll across interfaces of connected user devices after it is broadcast by the server or may indicate a duration that the digital image data will remain in its static location on the local AR world view. In another example, the server may choose a time for the digital image data. In an embodiment, the user may pay to extend the duration of the digital image data. The duration may be any amount of time, such as 15 seconds, 30 seconds, or a minute. The user may choose a color for the digital image data by using the color scale 620. The user may choose a color for the digital image data by selecting a color on the color scale 620. A variety of colors may be included on the color scale. In another example, the server may choose the color for the digital image data. A user may be required to pay in order to choose the color of the digital image data.

In an embodiment, the digital image data may be associated with a coordinate frame. The coordinate frame may be selected by the user and may indicate where the user wants the digital image data to be overlaid onto the local AR world view. The user may be required to pay to select the coordinate frame. For example, if the local AR world view displays the building, the user may want digital image data, such as a drawing, to be displayed near the base of the building. The coordinate frame may indicate a location near the base of the building. In another example, the user may want digital image data to be displayed near the top of the building. The coordinate frame may indicate a location near the top of the building. The user may be given an option to pay in order to select a desirable coordinate frame. In another example, the coordinate frame may be selected by the server. If the server selects the coordinate frame, the server may select whether the digital image data is displayed near the top or bottom of the building.

In another embodiment, the indication of user input comprises user feedback data, such as "likes" or "un-likes," or comments on the object. The user feedback may indicate whether the user likes or dislikes the AR world. The user feedback may include the user's comments on the AR world. For example, if the AR world includes the building, the user feedback may indicate whether the user likes or dislikes the building. The user feedback may also indicate whether the user likes or dislikes user input that has been input by other users. The user may "like" the AR world by selecting the "like" option 616. If the user has already "liked" the AR world, the user may also "un-like" the AR world by selecting the "like" option 616.

Referring back to FIG. 3, at 312, the at least one client device, such as the client device 104*a-d*, may receive a broadcast of user input. The broadcasted user input may include user input, such as text data or digital image data, input by that user or by other users. If the user input includes a coordinate frame, the user input may be broadcast to the at least one client device in the location indicated by the coordinate frame. At 314, the user of at least one client device, such as the client device 104*a-d*, may press a "like" button, such as like option 616. At 316, the at least one client device, such as the client device 104*a-d*, may receive an updated value of global likes. The updated value of global likes may reflect increases or decreases in the value of global likes. For example, the value of global likes may increase by one each time a user selects a "like' button, such as the "like" option 616. Each time a user "un-likes" the AR world, the value of global likes may decrease by one. The updated value of global likes may be displayed on an interface, such as interface 108, of the at least one client device. For example, the updated value of global likes may be displayed on the interface under the "like" button.

Figure 8:
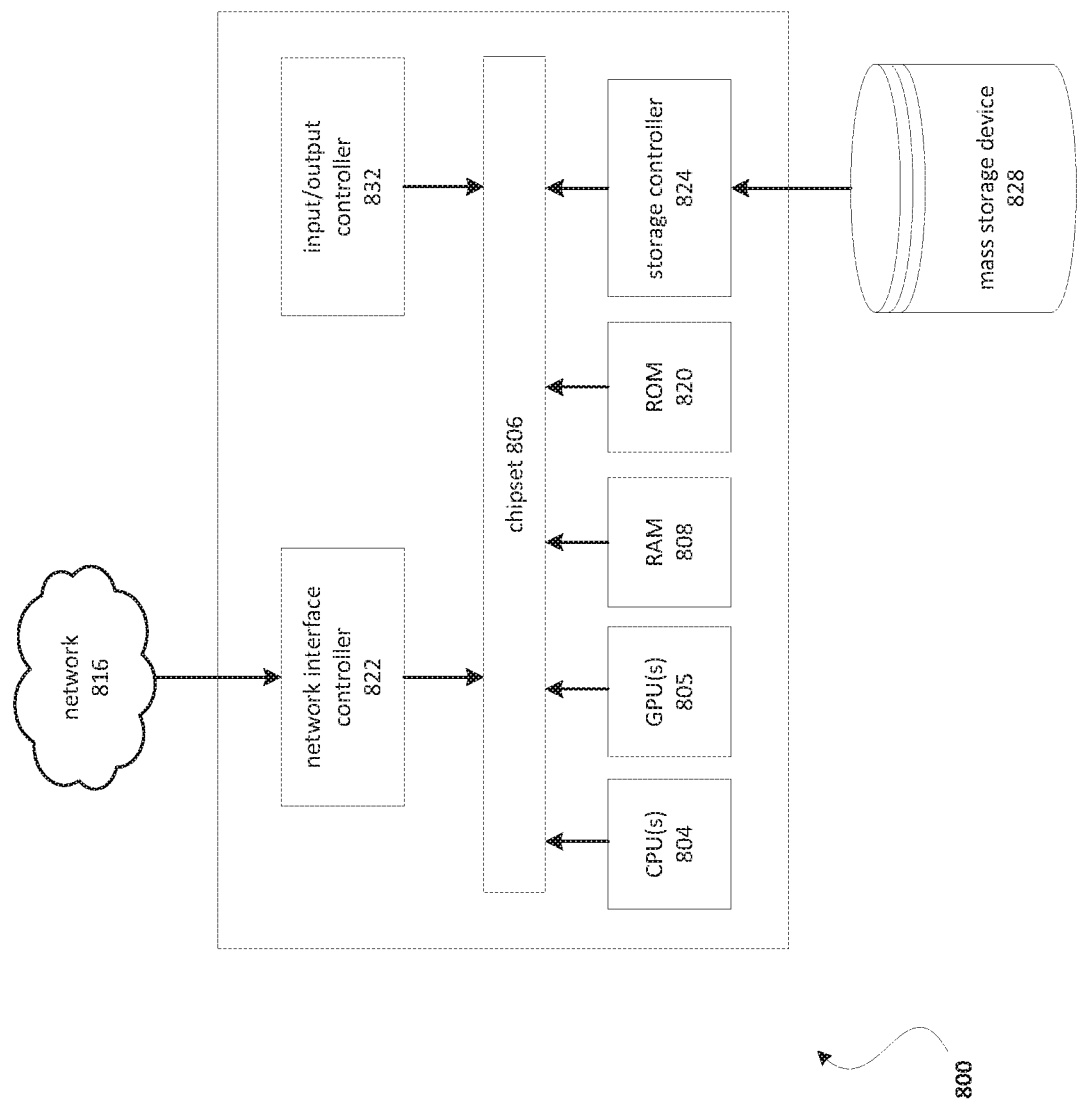
FIG. 8 shows an example computing device which may be used to perform any of the techniques disclosed herein.

FIG. 8 illustrates a computing device that may be used in various aspects, such as the services, networks, modules, and/or devices depicted in FIG. 1. With regard to the example architecture of FIG. 1, the message service, interface service, processing service, content service, cloud network, and client may each be implemented by one or more instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s). The GPU(s) may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random-access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN). The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. The mass storage device 828 may comprise a management component 810. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on the mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described herein.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A system, comprising:
   at least one database; and
   at least one computing device in communication with the at least one database, the at least one computing device configured to perform operations comprising:
   storing, in the at least one database, content associated with an object, the content being received from a first plurality of user devices, the first plurality of user devices providing information indicative of an association between the first plurality user devices and the object;
   receiving, from a second plurality of user devices, information indicating that the second plurality of user devices are proximate to the object;
   sending, to the second plurality of user devices, the content associated with the object and information indicative of a location of the content relative to the object for display of the content by the second plurality of user devices as an overlay on a camera view of the object by each of the second plurality of user devices; and
   storing, in the at least one database, additional content associated with the object, the additional content being received from the second plurality of user devices, the second plurality of user devices providing information indicative of an association between the additional content and at least one of the object or the content associated with the object.

2. The system of claim 1, wherein the object is a unique immobile object.

3. The system of claim 2, wherein receiving, from the second plurality of user devices, information indicating that the second plurality of user devices are proximate to the object comprises:
   receiving, from the second plurality of user devices, information indicating that the second plurality of user devices are proximate to a real-world environment including the unique immobile object or proximate to an image including the unique immobile object.

4. The system of claim 1, wherein the content associated with the object comprises text, a graphic, or information indicative of user feedback.

5. The system of claim 1, wherein the association between the first plurality of user devices and the object comprises a position of at least one of the first plurality of user devices relative to the object.

6. The system of claim 1, wherein the information indicative of the location of the content relative to the object is provided by the first plurality of user devices.

7. A method comprising:
   storing, in a database, content associated with an object, the content being received from a first plurality of user devices, the first plurality of user devices providing information indicative of an association between the first plurality of user devices and the object;
   receiving, from a second plurality of user devices, information indicating that the second plurality of user devices are proximate to the object;
   sending, to the second plurality of user devices, the content associated with the object and information indicative of a location of the content relative to the object for display of the content by the second plurality of user devices as an overlay on a camera view of the object by each of the second plurality of user devices; and
   storing, in the database, additional content associated with the object, the additional content being received from the second plurality of user devices, the second plurality of user devices providing information indicative of an association between the additional content and at least one of the object or the content associated with the object.

8. The method of claim 7, wherein the object is a unique immobile object.

9. The method of claim 8, wherein receiving, from the second plurality of user devices, information indicating that the second plurality of user devices are proximate to the object comprises:
   receiving, from the second plurality of user devices, information indicating that the second plurality of user devices are proximate to a real-world environment including the unique immobile object or proximate to an image including the unique immobile object.

10. The method of claim 7, wherein the content associated with the object comprises text data, image data, or information indicative of user feedback associated with the object.

11. A computing device, comprising:
    at least one processor; and
    at least one memory communicatively coupled to the at least one processor and storing instructions that upon execution by the at least one processor cause the computing device to:
    determine that the computing device is proximate to a first object;
    receive, from a database, content associated with the first object and information indicative of a location of the content relative to the first object, the content being sent to the database from a first plurality of user devices, the first plurality of user devices providing information indicative of an association between the first plurality of user devices and the first object;
    display, on an interface of the computing device, the content associated with the first object as an overlay on a camera view of the first object; and
    send, to the database, additional content associated with at least one of the first object or the content associated with the first object.

12. The computing device of claim 11, wherein the at least one memory further storing instructions that upon execution by the at least one processor cause the computing device to:
    send, to the database, information indicative of a location of the additional content relative to the first object.

13. The computing device of claim 11, wherein the content associated with the first object comprise at least one of text, a graphic, or information indicative of user feedback.

14. The computing device of claim 11, wherein the first object comprises a unique immobile object.

15. The computing device of claim 14, wherein the computing device is proximate to the first object when the computing device is proximate to a real-world environment including the unique immobile object or proximate to an image including the unique immobile object.

16. The computing device of claim 11, wherein the at least one memory further storing instructions that upon execution by the at least one processor cause the computing device to:
   determine that the computing device is proximate to a second object, the second object being different than the first object;
   receive, from the database, content associated with the second object and information indicative of a location of the content relative to the second object, the content being sent to the database from a second plurality of user devices, the second plurality of user devices providing information indicative of an association between the second plurality of user devices and the second object; and
   display, on an interface of the computing device, the content associated with the second object as an overlay on a camera view of the second object.

17. A method comprising:
   determining that a device is proximate to a first object;
   receiving, from a database, content associated with the first object and information indicative of a location of the content relative to the first object, the content being sent to the database from a first plurality of user devices, the first plurality of user devices providing information indicative of an association between the first plurality of user devices and the first object;
   displaying, on an interface of the device, the content associated with the first object as an overlay on a camera view of the first object; and
   sending, to the database, additional content associated with at least one of the first object or the content associated with the first object.

18. The method of claim 17, wherein the first object is a unique immobile object.

19. The method of claim 18, wherein the device is proximate to the first object when the device is proximate to a real-world environment including the unique immobile object or proximate to an image including the unique immobile object.

20. The method of claim 17, wherein the content associated with the first object comprise at least one of text, a graphic, or information indicative of user feedback.

21. The method of claim 17, further comprising:
   sending, to the database, information indicative of a location of the additional content relative to the first object.

22. The method of claim 17, further comprising:
   determining that the device is proximate to a second object, the second object being different than the first object;
   receiving, from the database, content associated with the second object and information indicative of a location of the content relative to the second object, the content being sent to the database from a second plurality of user devices, the second plurality of user devices providing information indicative of an association between the second plurality of user devices and the second object; and
   displaying, on an interface of the device, the content associated with the second object as an overlay on a camera view of the second object.

* * * * *